United States Patent
Lindenman et al.

(10) Patent No.: US 6,942,236 B2
(45) Date of Patent: Sep. 13, 2005

(54) FIFTH WHEEL HITCH WITH ROCKER

(75) Inventors: Thomas W. Lindenman, South Bend, IN (US); Richard W. McCoy, Granger, IN (US)

(73) Assignee: Cequent Towing Products, Inc., Plymouth, MI (US)

( * ) Notice: Subject to any disclaimer, the term of this patent is extended or adjusted under 35 U.S.C. 154(b) by 10 days.

(21) Appl. No.: 10/225,627

(22) Filed: Aug. 22, 2002

(65) Prior Publication Data
US 2003/0038452 A1 Feb. 27, 2003

Related U.S. Application Data
(60) Provisional application No. 60/314,989, filed on Aug. 24, 2001.

(51) Int. Cl.[7] .............................................. B62D 53/08
(52) U.S. Cl. ..................... 280/438.1; 280/433; 280/492
(58) Field of Search .............................. 280/433, 438.1, 280/439, 441, 441.1, 492

(56) References Cited

U.S. PATENT DOCUMENTS

| | | | |
|---|---|---|---|
| 2,673,094 A | 3/1954 | Martin | |
| 2,726,879 A | 12/1955 | Vaillant | |
| 2,794,656 A | 6/1957 | Seyferth | |
| 2,833,561 A | 5/1958 | Vougoyeau | |
| 2,958,542 A | 11/1960 | Janeway | |
| 3,122,382 A | 2/1964 | Carrier | |
| 3,202,712 A | * 8/1965 | Lorrin | .......................... 564/306 |
| 3,309,111 A | 3/1967 | Vaugoyeau | |
| 3,528,683 A | 9/1970 | Janeway | |
| 4,121,853 A | * 10/1978 | McKay | ....................... 280/433 |
| 4,199,168 A | 4/1980 | Bush et al. | |
| 4,444,408 A | 4/1984 | Goth | |
| 4,946,184 A | * 8/1990 | Larocco | ....................... 280/433 |
| 5,860,662 A | * 1/1999 | Bartoshesky et al. | ........ 280/204 |

OTHER PUBLICATIONS

"Heavy Duty Truck Systems", Andrew Norman et al. 1991, p. 748.*

* cited by examiner

*Primary Examiner*—Anne Marie Boehler
(74) *Attorney, Agent, or Firm*—Robert H. Earp, III; Todd A. Benni; McDonald Hopkins Co., LPA

(57) ABSTRACT

A fifth wheel hitch includes a head assembly having a skid plate with an opening for receiving a king pin of a trailer and a locking jaw assembly for securing the king pin in proper position with the trailer over the skid plate. Additionally, the fifth wheel hitch includes a rocking platform having an arcuate rocking surface and upstanding wings at each end thereof. A pair of pivot pins are provided for mounting the head assembly to the wings of the rocking platform while allowing pivotal/tilting movement of the head assembly in a fore-and-aft direction relative to the rocking platform. A base is provided including a cradle for receiving the rocking platform. The cradle allows side-to-side rocking movement of the rocking platform and the head assembly relative to the base. The base includes first and second pairs of opposed mounting lugs. A pair of mounting pins are received in the first and second pairs of mounting lugs and serve to capture the rocking platform on the cradle of the base.

13 Claims, 4 Drawing Sheets

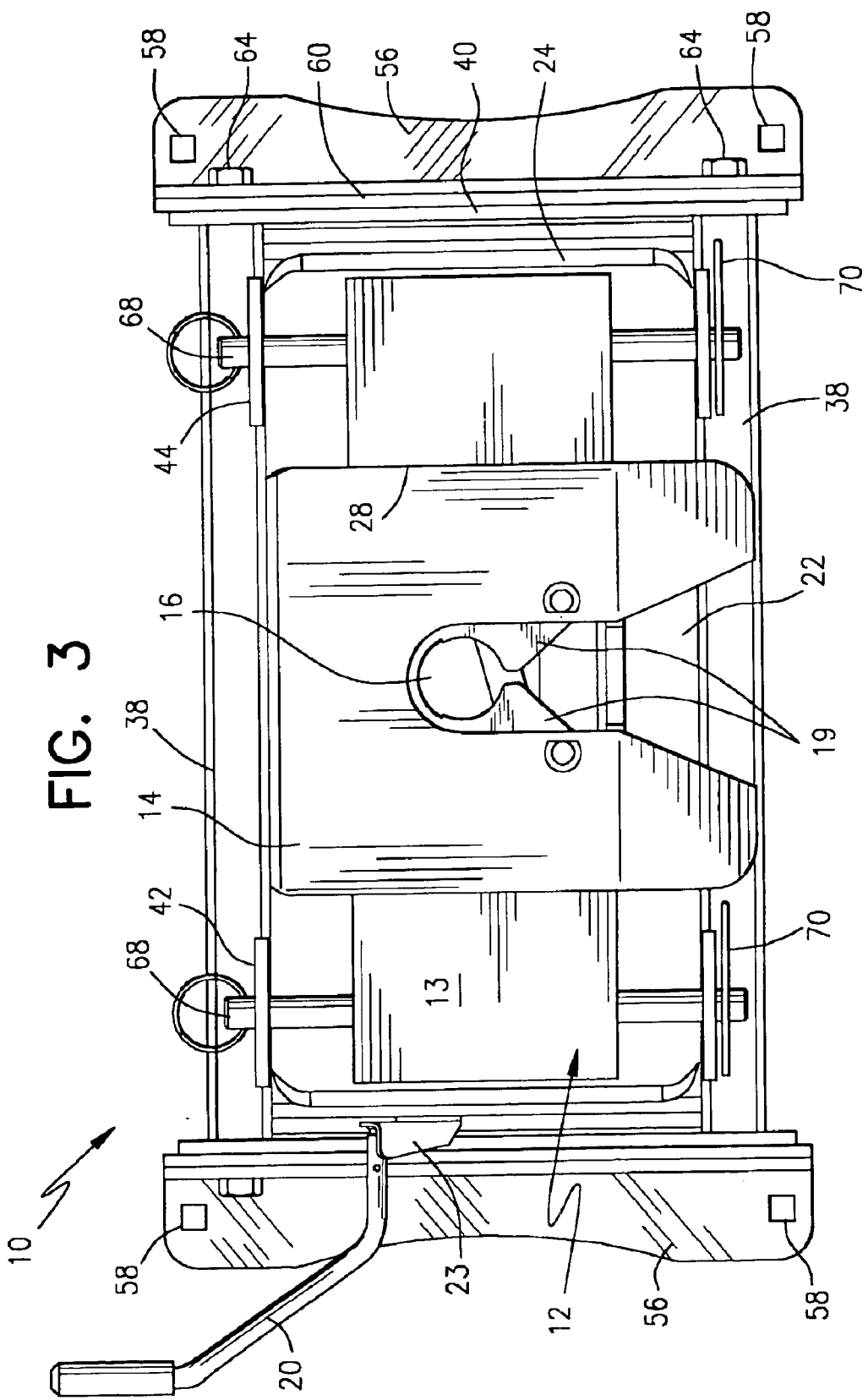

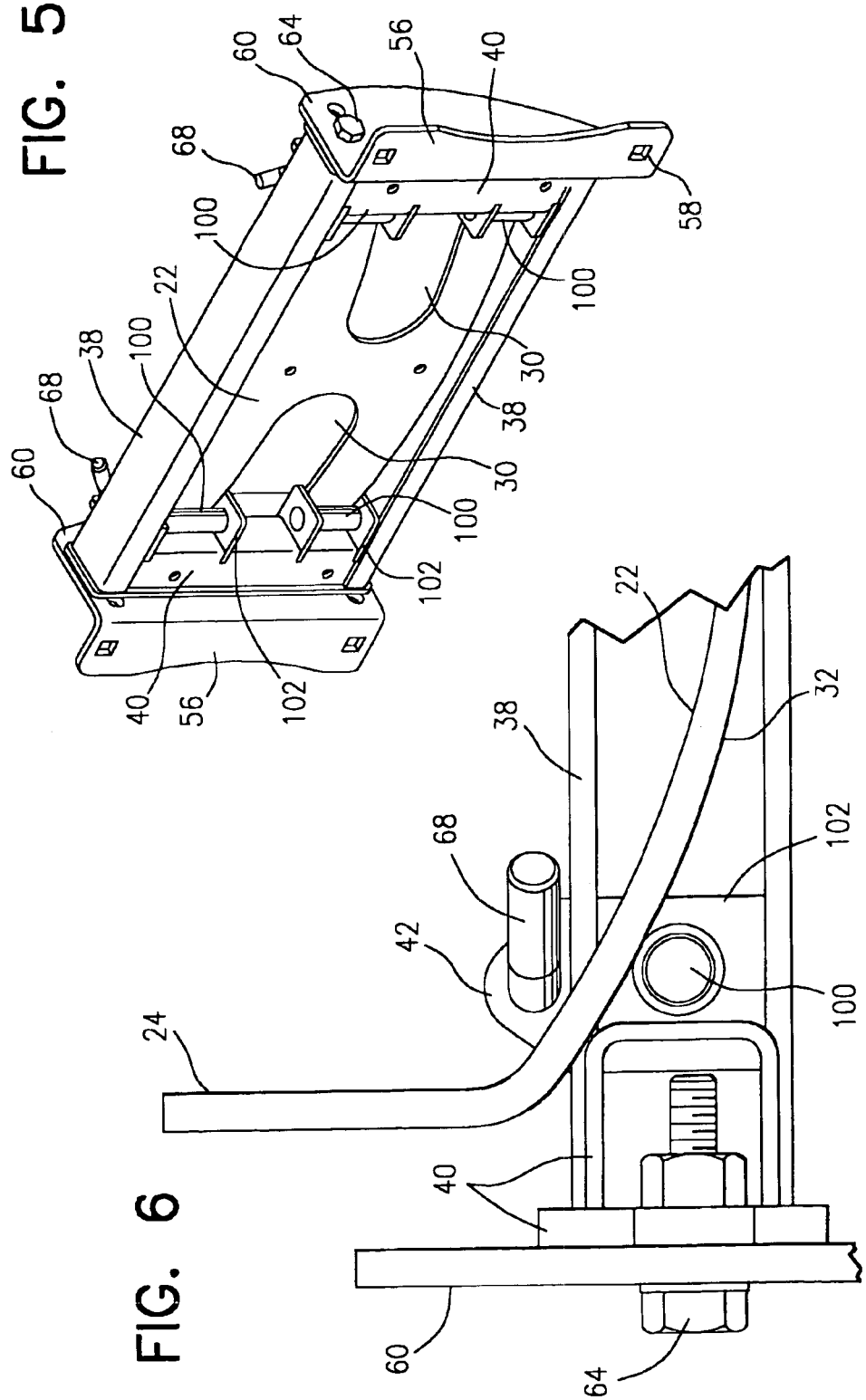

FIFTH WHEEL HITCH WITH ROCKER

This application claims the benefit of U.S. Provisional Patent Application Ser. No. 60/314,989 filed Aug. 24, 2001.

TECHNICAL FIELD

The present invention relates generally to the trailer towing field, and more particularly, to an improved fifth wheel hitch providing both fore-and-aft tilting and side-to-side rocking action.

BACKGROUND OF THE INVENTION

Fifth wheel hitches for towing a trailer behind a towing vehicle, such as a pick-up truck, have long been known in the art. Examples of state of the art fifth wheel hitches include those presently manufactured by Reese Products, Inc., of Elkhart, Ind.

These state of the art fifth wheel hitches include a support frame for mounting the hitch to the towing vehicle, such as, for example, the bed of a pick-up truck. The support frame includes a pair of mounting rails that are bolted to the bed and/or frame of the truck, side brackets that are releasably mounted to the rails and a head support mounted to the side brackets. A head assembly is mounted to the head support by means of a trunnion arrangement allowing fore-and-aft pivotal movement. The head assembly includes a jaw assembly, operable by means of a control handle, that is specifically adapted to releasably engage and hold a king pin of a trailer desired to be towed by the towing vehicle.

While such state of the art fifth wheel hitches provide excellent overall performance and dependable operation, it is believed that improvements in design are still possible. More particularly, under certain operating conditions (e.g., when traversing a hillside in a campground area) it is desirable to provide the head assembly with limited side-to-side pivotal movement capability. Combined fore-and-aft and side-to-side pivotal movement of the head assembly insures smooth towing action under substantially any foreseeable operating conditions.

SUMMARY OF THE INVENTION

In accordance with the purposes of the present invention as described herein, a fifth wheel hitch is provided including a head assembly having a skid plate with an opening for receiving a king pin of a trailer and a locking jaw assembly for securing the king pin in proper position with the trailer over the skid plate. The fifth wheel hitch also includes a rocking platform having an arcuate rocking surface and upstanding wings at each end thereof. A pair of pivot pins are provided for mounting the head assembly to the wings of the rocking platform to allow pivotal or tilting movement of the head assembly in a fore-and-aft direction relative to the rocking platform. A base including a cradle is provided for receiving the rocking platform. This allows side-to-side rocking movement of the rocking platform and therefore, the head assembly relative to the base. The base includes first and second pairs of opposed mounting lugs. A pair of mounting pins are received in the first and second pair of mounting lugs. These pins capture the rocking platform on the cradle of the base so as to allow for the limited side-to-side tilting movement.

More specifically describing the invention, the rocking platform with the upstanding wings is substantially U-shaped. The arcuate rocking surface of that platform has an area of between 135–140 square inches and a radius of curvature of between substantially 17 inches–19 inches. Additionally, the arcuate rocking surface includes a central opening which reduces the weight of the rocking platform without compromising any of its desirable characteristics.

In one embodiment, the cradle includes four cooperating bearing pads, which support the rocking platform. The bearing pads may be made from polytetrafluoroethylene or other appropriate strong but low friction material (e.g., DELRIN AF. which is a well known trademark of E.I. du Pont De Nemours and Company identifying a material made of Acetal filled with TEFLON (polytetrafluoroethylene)) capable of supporting the weight of the trailer. Each of the bearing pads has a surface area of at least 7.2 square inches. In another, alternative embodiment the cradle includes a series of four rollers for supporting the rocking platform and allowing rocking movement thereof with a minimum of frictional resistance. Additionally, the fifth wheel hitch includes a pair of pin clips for securing the pair of mounting pins in the first and second pair of mounting lugs.

Still other objects of the present invention will become readily apparent to those skilled in this art from the following description: wherein there is shown and described a preferred embodiment of this invention simply by way of illustration of one of the modes best suited to carry out the invention. As it will be realized, the invention is capable of other different embodiments and its several details are capable of modification in various, obvious aspects all without departing from the invention. Accordingly, the drawings and descriptions will be regarded as illustrative in nature and not as restrictive.

BRIEF DESCRIPTION OF THE DRAWINGS

The accompanying drawings incorporated in and forming a part of the specification, illustrate several aspects of the present invention, and together with the description serve to explain the principles of the invention. In the drawings:

FIG. 3 is a top plan view;

FIG. 5 is a bottom perspective view of an alternative embodiment of the present invention equipped with rollers to allow rocking side-to-side movement of the head assembly; and FIG. 6 is a detailed schematical and elevational view showing the embodiment of FIG. 5.

Reference will now be made in detail to the present preferred embodiment of the invention, an example of which is illustrated in the accompanying drawings.

DETAILED DESCRIPTION OF THE INVENTION

Figure 1:
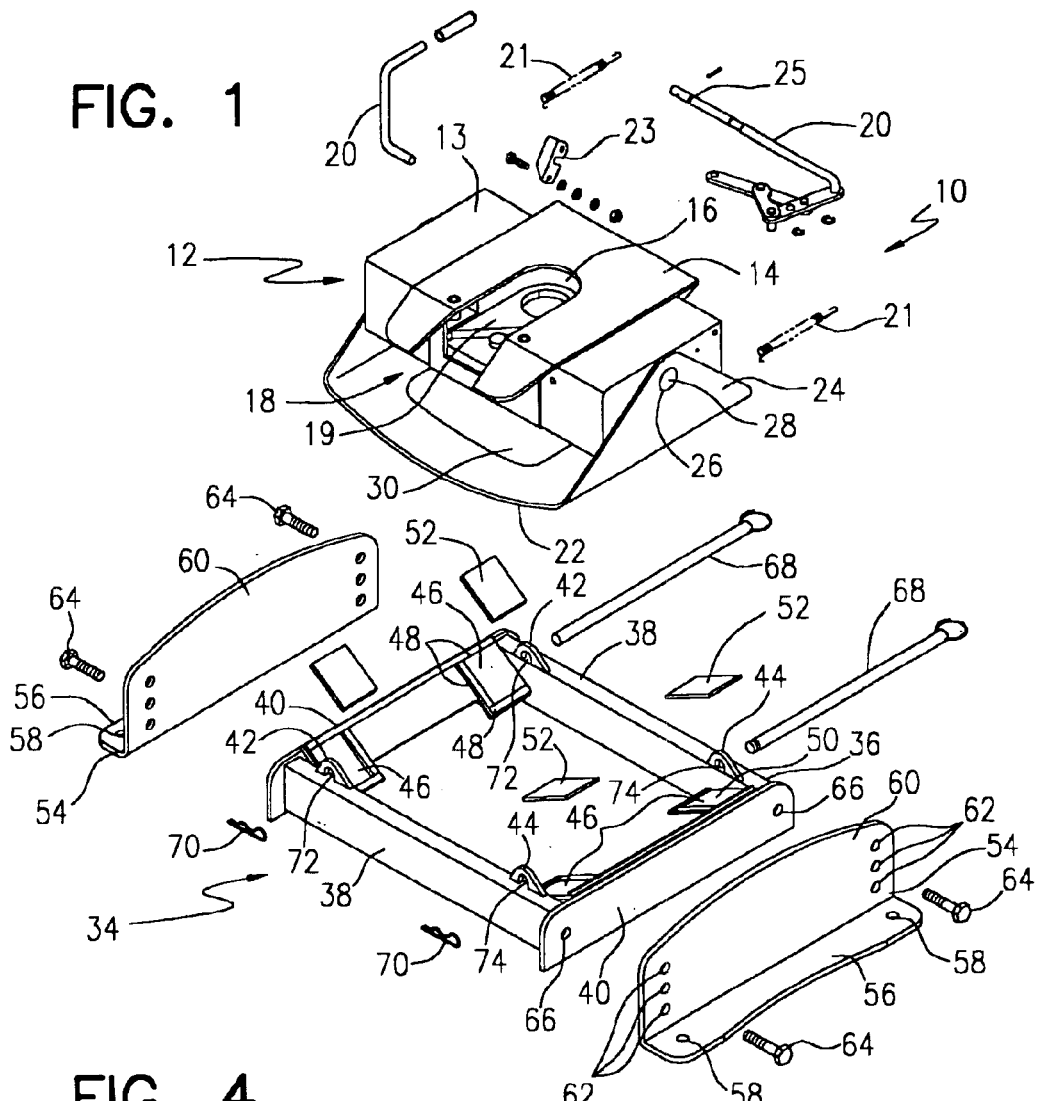
FIG. 1 is an exploded perspective view of the fifth wheel hitch assembly of the present invention.
Figure 4:
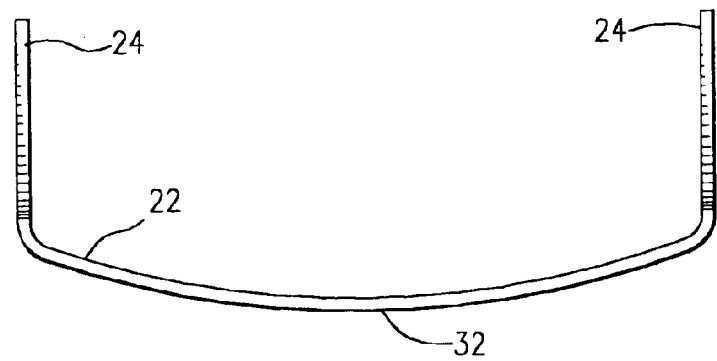
FIG. 4 is a rear elevational view of the rocking platform showing the arcuate nature of the rocking surface.
Figure 2:
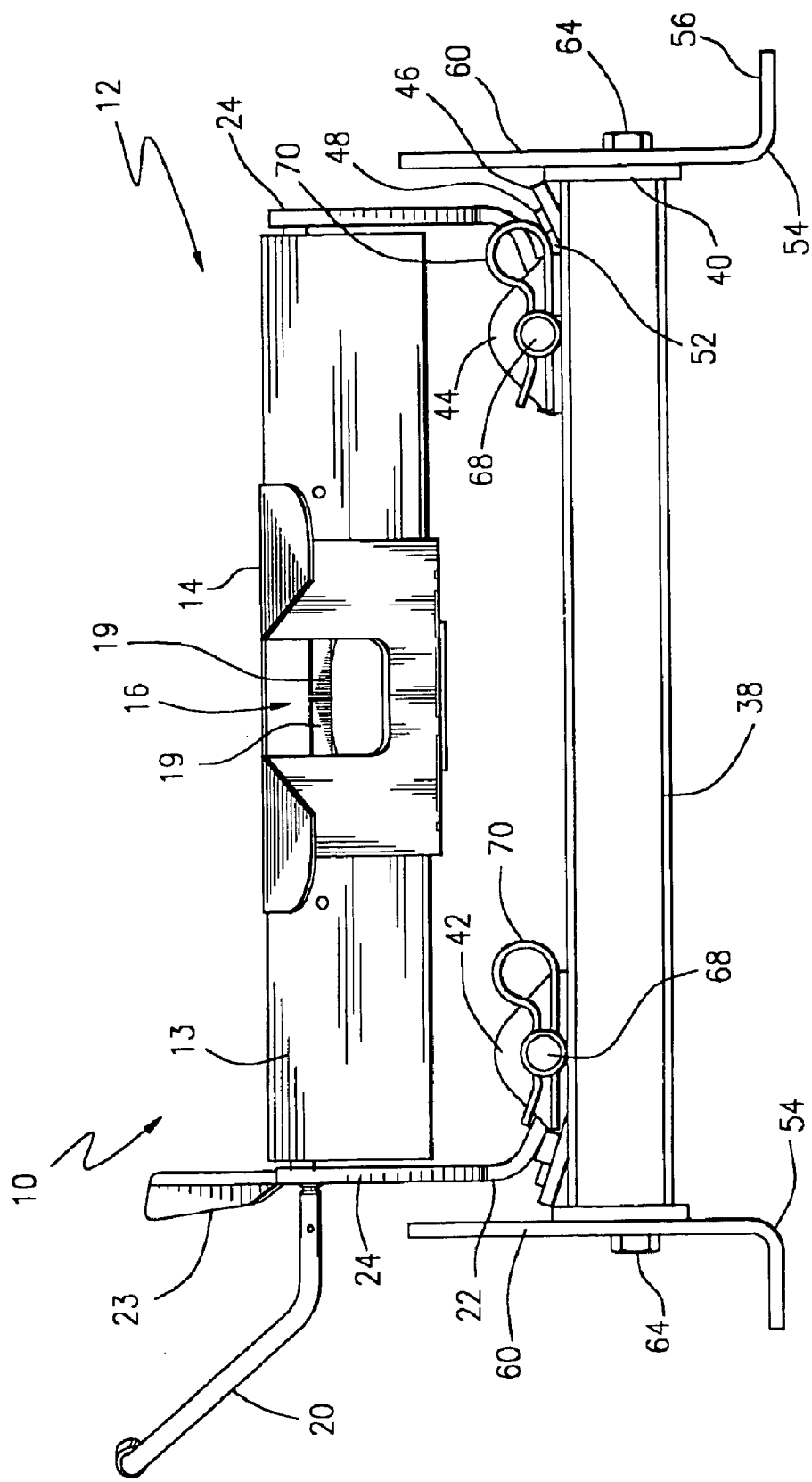
FIG. 2 is a rear side elevational view.

Reference is now made to drawing FIG. 1 showing the fifth wheel hitch 10 of the present invention. The fifth wheel hitch 10 includes a head assembly 12. Head assembly 12 includes a housing 13 carrying a skid plate 14 and having an opening 16 therein for receiving a king pin of a trailer. Head assembly 12 also includes a locking jaw assembly, generally designated by reference numeral 18, for securing the king pin of the trailer in proper position with the trailer over the skid plate 14. The locking jaw assembly 18 may be of any type known in the art including but not limited to those structures described in detail in U.S. Pat. Nos. 4,721,323 to Czuk, et al and 5,516,137 to Kass, et al both of which are assigned to the assignee of the present invention. Generally, such locking jaw assemblies 18 include a control handle and linkage arrangement 20 for manipulating the jaws 19 between a fully opened position for receipt of the king pin when connecting a trailer and a fully closed position for capturing the king pin and securing the trailer to the fifth wheel hitch 10 for towing. Springs 21 bias the jaws 19 to the fully closed position shown in FIGS. 2 and 3. A latch 23 engages a groove 25 in the control handle 20 to secure the jaws 19 in the locked position.

The fifth wheel hitch 10 also includes a rocking platform 22. The rocking platform 22 may be formed in a substantially U-shape from a continuous piece of 0.375 thick gauge steel. The rocking platform 22 includes an upstanding wing 24 at each end thereof. Each wing 24 includes an aperture 26 for receiving a pivot pin 28 carried at each end of the head assembly 12. The pivot pins 28 allow the head assembly 12 to freely pivot with respect to the rocking platform 22 and thereby provide free tilting movement in the fore-and-aft directions. As best shown in FIG. 1, the rocking platform 22 also includes a central opening 30 which reduces the material requirements for constructing the rocking platform and also reduces the overall weight thereof. This is done without compromising the operating characteristics of the rocking platform 22 which still provides between substantially 135–140 square inches of surface area for supporting the weight of a trailer.

The rocking platform 22 provides an arcuate rocking surface 32 having a radius of curvature of between about 17 to about 19 inches in order to allow side-to-side movement of the head assembly 12 as will become more apparent as the description thereof proceeds. The fifth wheel hitch 10 also includes a base generally designated by reference numeral 34. Base 34 comprises a substantially rectangular shaped cradle 36. Cradle 36 includes a pair of cross members 38 and a pair of cooperating end members 40 preferably formed from steel or other strong material.

The cradle 36 also includes a first pair of upstanding mounting lugs 42 and a second pair of upstanding mounting lugs 44. As shown, one of each of the pair of mounting lugs 42, 44 is provided on each of the cross members 38. Additionally, the cradle 36 includes four inclined platforms 46 positioned adjacent each inside corner of the cradle. Each of the platforms 46 includes three raised edges 48 that cooperate with the adjacent cross member 38 so as to provide a cavity 50 for receiving a bearing pad 52.

Each bearing pad 52 is formed from polytetrafluoroethylene or other appropriate strong, low friction material. Each of the bearing pads 52 provides a bearing surface area of at least substantially 7.2 square inches. As will be described in greater detail below, the bearing pads 52 engage the arcuate rocking surface 32 of the rocking platform 22 when the fifth wheel hitch 10 is fully assembled.

As further shown in the drawing figures, the base 34 also includes upright end mounting brackets 54. Mounting brackets 54 each include a mounting flange 56 including apertures 58 that receive bolts (not shown) for securing the fifth wheel hitch 10 to the towing vehicle. The upstanding leg 60 of the substantially L-shaped mounting brackets 54 each includes two series of three vertically spaced apertures 62. The cradle 36 is mounted to the end of mounting brackets 54 by bolts 64 that pass through the apertures 62 in the end mounting brackets and aligned aperture 66 provided in the end members 40 of the cradle. The mounting height of cradle 36 in the end mounting brackets 54 may be selected by completing connection with the bolts 64 through the upper, middle or lower apertures 62 of the two series of apertures provided in the end mounting brackets.

When the fifth wheel hitch 10 is fully assembled, the head assembly 12 rests over the cradle 36. Specifically, the rocking platform 22 is received between the cross members 38 of the cradle 36 with the arcuate rocking surface 32 resting on the bearing pads 52. A pair of mounting pins 68 complete the connection. More specifically, one mounting pin 68 is engaged in the aligned apertures 72 in the first pair of mounting lugs 42 while the other mounting pin is engaged in the aligned apertures 74 in the second pair of mounting lugs 44. In this position, the pins 68 also overlie the rocking platform 22. Pin clips 70 are engaged on the distal ends of the mounting pins 68 in order to prevent the mounting pins 68 from being inadvertently withdrawn from the mounting lugs 42, 44.

Advantageously, the mounting pins 68 capture the rocking platform 22 in a position with the arcuate rocking surface 32 of the rocking platform resting on the bearing pads 52 of the cradle 36. The pins 68 still, however, allow limited side-to-side rocking motion of the rocking platform 22 on the bearing pads 52 and therefore, limited side-to-side rocking motion of the head assembly 12. This in combination with the tilting fore-and-aft movement allowed by the pivot pins 28 provides the head assembly 12 with movement capability in two perpendicular planes. Accordingly, the head assembly 12 can better accommodate trailer movements particularly when traversing hillsides and backing in and around tight spaces requiring sharp turns such as at campgrounds or other similar sights.

A second, alternative embodiment of the fifth wheel hitch 10 is illustrated in FIGS. 5 and 6. In this embodiment, the four bearing pads 52 are replaced with rollers 100. The rollers 100 are each held for rotation in a pair of cooperating support brackets 102 secured to the end members 40. The rollers 100 each include an axis of rotation that is aligned with the longitudinal axis of the vehicle to which the fifth wheel hitch 10 is mounted. Consequently, the rollers 100 are aligned to engage the rocking platform 22 to allow smooth and efficient side-to-side rocking movement with a minimum of friction.

In summary, numerous benefits result from employing the concepts of the present invention. The fifth wheel hitch 10 incorporates a unique rocking platform 22 with a large surface area supported on a series of low friction bearing pads 52. In an alternative embodiment, the pads 52 are replaced with rollers 100. These two different structures both provide relatively free side-to-side movement of the head assembly 12. Of course, the bearing pads 52 and rollers 100 may be readily and easily replaced if necessary. The bearing pads 52 may be secured in the cavities 50 with adhesive and may be easily removed with a prying tool in the event replacement becomes necessary.

The foregoing description of a preferred embodiment of the invention has been presented for purposes of illustration and description. It is not intended to be exhaustive or to limit the invention to the precise form disclosed. Obvious modifications or variations are possible in light of the above teachings. The embodiment was chosen and described to provide the best illustration of the principles of the invention and its practical application to thereby enable one of ordinary skill in the art to utilize the invention in various embodiments and with various modification as are suited to the particular use contemplated. All such modifications and variations are within the scope of the invention as determined by the appended claims when interpreted in accordance with the breath to which they are fairly, legally and equitably entitled.

What is claimed:

1. A fifth wheel hitch comprising;
   a head assembly including a skid plate having an opening for receiving a king pin of a trailer and a locking jaw assembly for securing the king pin in proper position with the trailer over said skid plate;
   a rocking platform having an arcuate rocking surface;
   a pair of pivot pins for mounting said head assembly to said rocking platform to allow pivotal tilting movement of said head assembly in a fore-and-aft direction relative to said rocking platform;
   a base including a cradle for receiving said rocking platform to allow side-to-side rocking movement of said rocking platform and said head assembly relative to said base, said base also including first and second pairs of opposed mounting lugs; and
   a pair of mounting pins received in said first and second pairs of mounting lugs and capturing said rocking platform on said cradle of said base while allowing the side-to-side rocking movement.

2. The assembly of claim 1, wherein said rocking platform is substantially U-shaped.

3. The assembly of claim 2, wherein said arcuate rocking surface has an area of between substantially 135–140 square inches.

4. The assembly of claim 2, wherein said arcuate rocking surface has radius of curvature between substantially 17 inches–19 inches.

5. The assembly of claim 2, wherein said arcuate rocking surface includes a central opening.

6. The assembly of claim 2, wherein said cradle includes four cooperating bearing pads for engaging the arcuate rocking surface.

7. The assembly of claim 6, wherein said bearing pads are made from DELRIN AF.

8. The assembly of claim 6, wherein said bearing pads each have a surface area of at least 7.2 square inches.

9. The assembly of claim 1, further including a pair of pin clips for securing said pair of mounting pins in said first and second pair of mounting lugs.

10. The assembly of claim 2, wherein said cradle includes four cooperating rollers for engaging said rocking platform and allowing smooth side-to-side rocking movement of said rocking platform relative to said cradle.

11. The assembly of claim 2, wherein said cradle includes at least two rollers for engaging said arcuate rocking surface and allowing smooth side-to-side rocking movement said rocking platform relative to said cradle.

12. The assembly of claim 2, wherein said cradle includes at least one bearing pad for engaging said arcuate rocking surface and allowing smooth side-to-side rocking movement of said rocking platform relative to said cradle.

13. The assembly of claim 12, wherein said at least one bearing pad is made from DELRIN AF.

* * * * *